UNITED STATES PATENT OFFICE.

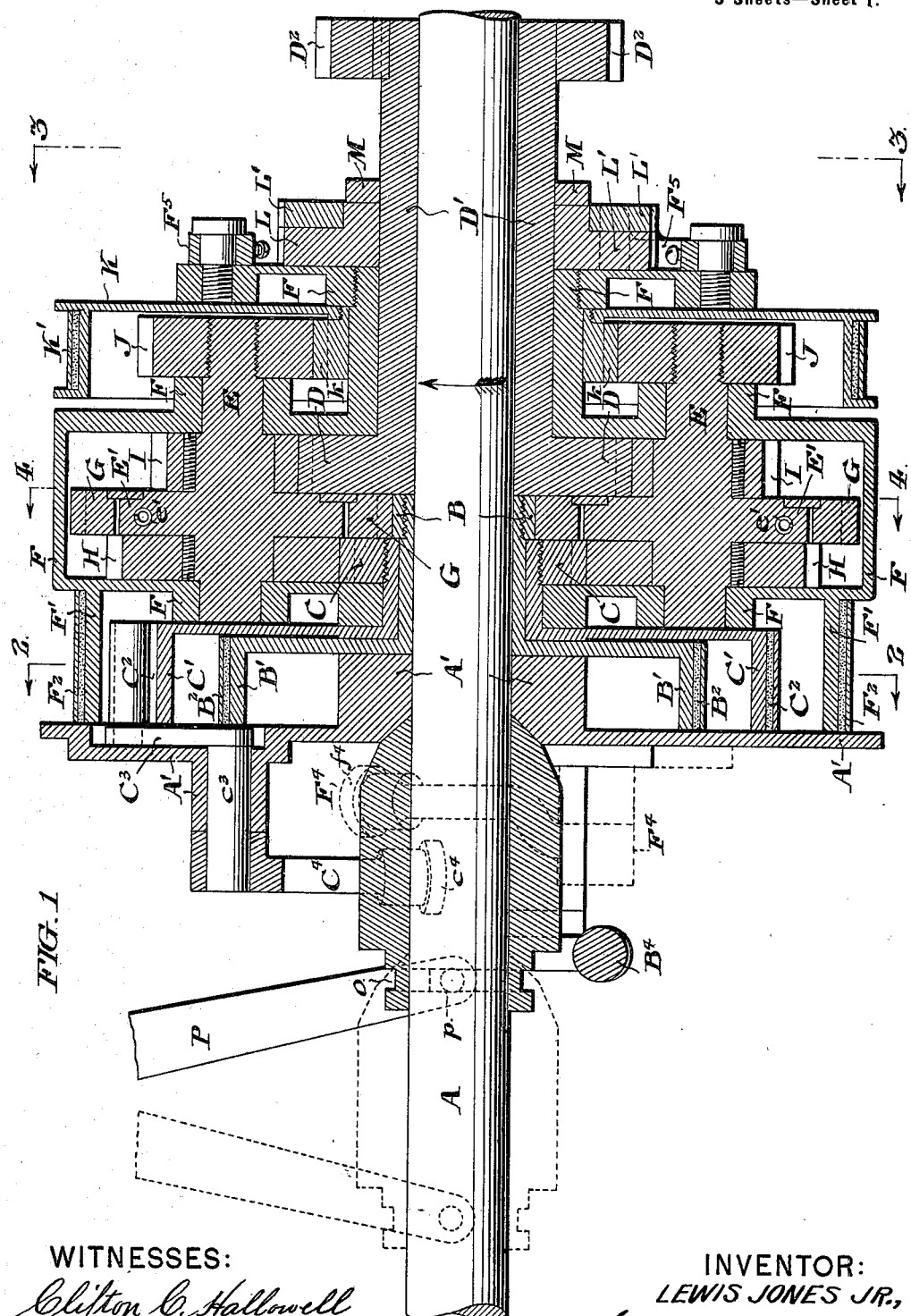

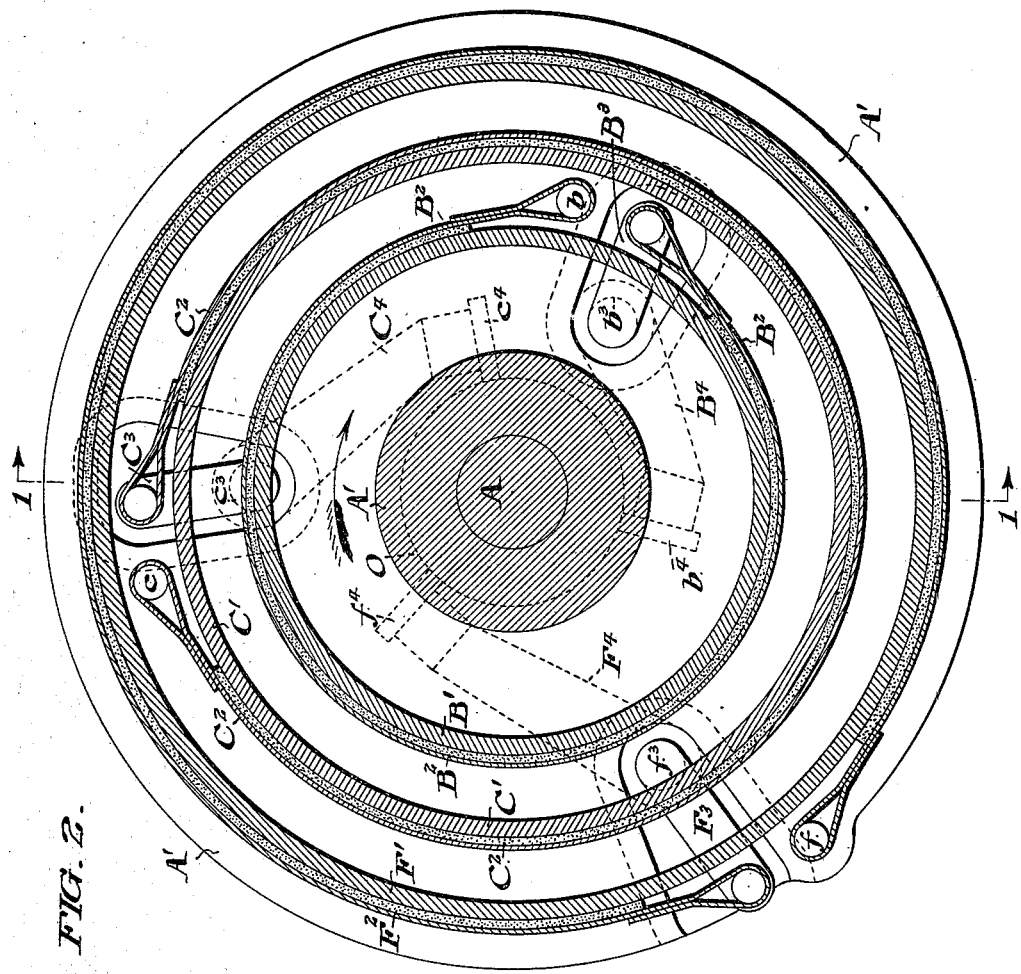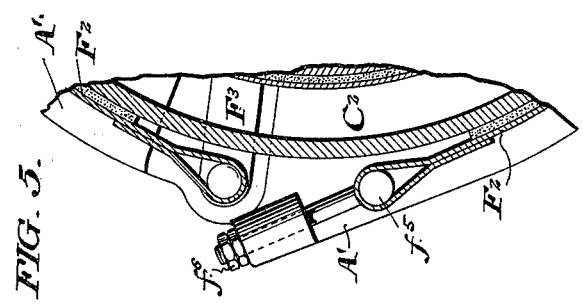

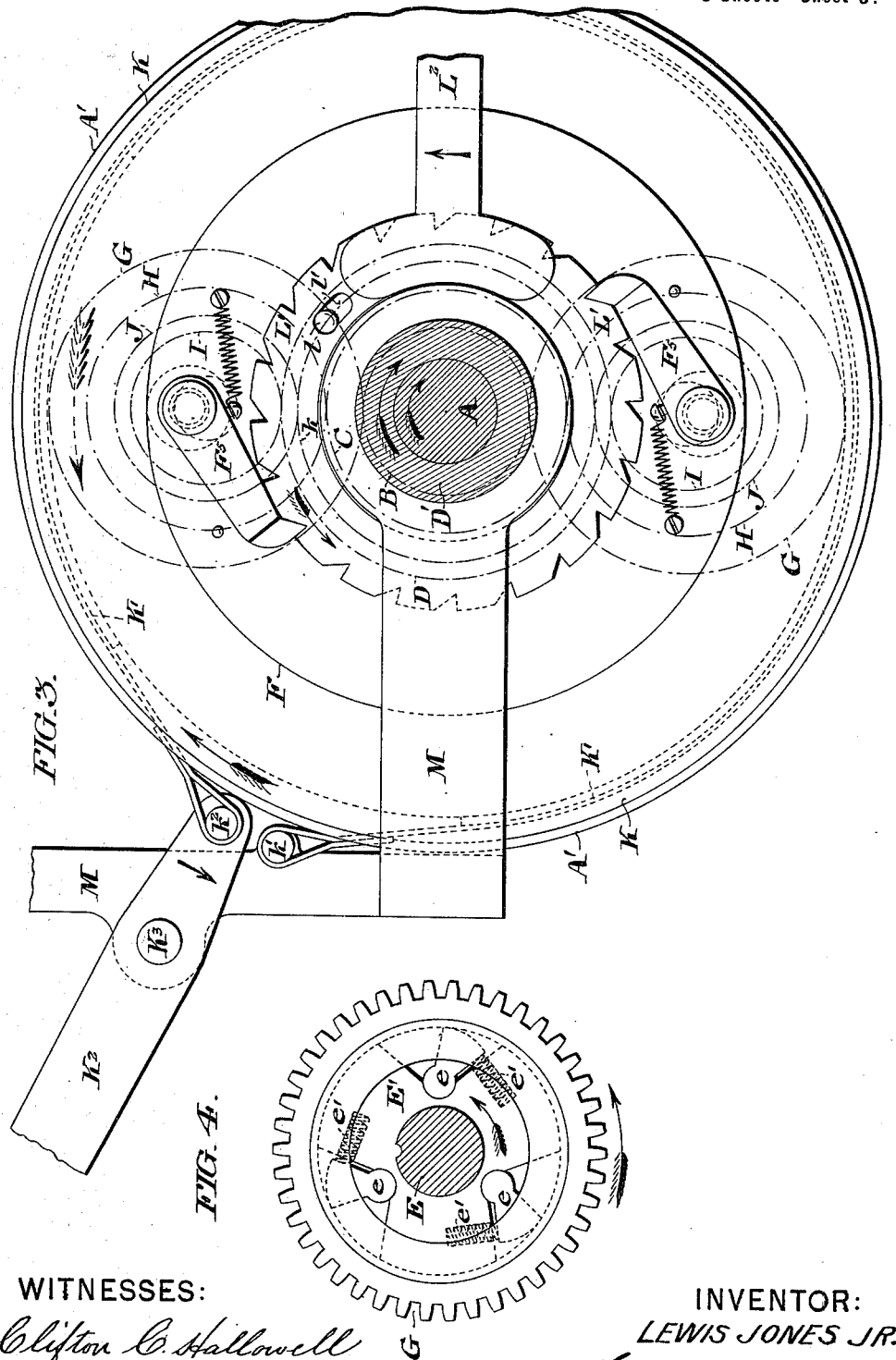

LEWIS JONES, JR., OF PHILADELPHIA, PENNSYLVANIA.

VARIABLE-SPEED GEARING.

SPECIFICATION forming part of Letters Patent No. 672,779, dated April 23, 1901.

Application filed December 7, 1900. Serial No. 38,987. (No model.)

*To all whom it may concern:*

Be it known that I, LEWIS JONES, Jr., of Philadelphia, in the State of Pennsylvania, have invented certain new and useful Improvements in Variable-Speed Gearing, whereof the following is a specification, reference being had to the accompanying drawings.

My invention relates to devices comprising a driving element and a driven element, a series of gears connecting said elements, and means to alter the relation of said gears, and thereby vary the relative speed of rotation of the driving and driven elements of the combination from one to the other of a number of speeds predetermined by the arrangement of the parts.

It is the object of my present invention to provide a device of the class specified of such construction as to adapt it for embodiment in a vehicle as a medium between the vehicle-motor and the vehicle-wheels, to permit variation in the speed of traverse of the vehicle without alteration in the speed of rotation of the motor, and to reverse the direction of traverse of the vehicle at the will of the operator.

In the accompanying drawings, Figure 1 is a longitudinal sectional view of a device conveniently embodying my invention. Fig. 2 is a transverse sectional view of said device, taken on the line 2 2 in Fig. 1. Fig. 3 is a transverse sectional view of said device, taken on the line 3 3 in Fig. 1. Fig. 4 is a sectional view of one of the planetary-gear elements, taken on the line 4 4 in Fig. 1. Fig. 5 is a fragmentary sectional view showing means for adjusting the tension of the band-clutches.

The form of my invention which I have chosen for illustration is particularly arranged for embodiment in an automobile, whose motor-shaft (shown at A in the figures) is herein termed the "driving-shaft." Loosely mounted upon said shaft A, in concentric relation therewith, are three gears B, C, and D. As hereinafter described, the device which I have chosen for illustration is so arranged that said gears B and C may be secured to the shaft A and either one or the other of them serve to drive, by intermediate planetary gears, the gear D, which is fixed upon the driven sleeve D', and through said sleeve and the gear $D^2$, fixed upon the outer extremity thereof, transfer motion in either direction to the supporting-wheels of the vehicle. As hereinafter specified, the device shown is arranged to rotate said sleeve D' at either one of three speeds, the lowest speed being produced when the gear B is secured to the shaft A, the medium speed when the gear C is secured to said shaft, and the highest speed when through the intervening gears said sleeve D' is secured in fixed relation with said shaft A and rotates therewith. Moreover, said device is so arranged that at either the slowest or the medium speed the sleeve D' may be rotated either in the direction of rotation of the shaft A or in the opposite direction to effect the forward or backward movement of the vehicle at the will of the operator. Said shaft-gears B and C are operatively connected with the sleeve-gear D by planetary gears which are in duplicate trains, respectively arranged upon counterpart spindles E, mounted for rotation in the drum F. The planetary gears G are engaged with the shaft-gear B, the planetary gears H are engaged with the shaft-gear C, the planetary gears I are engaged with the gear D upon said sleeve, and the planetary gears J, exterior to said drum F, engage with the gear $k$ upon the reversing brake-drum K.

The shaft A rotates continuously at uniform speed in the direction of the arrow shown thereon in Fig. 1, and when the gear B is secured to the shaft A it drives the gear G in the direction indicated by the arrow upon Fig. 4. Said gear G is annular, and its inner circumference is opposed to friction-pawls $e$, which are mounted for oscillation in the hub E' of the spindle E and pressed into engagement with said gear G by respective springs $e'$. Rotation of the spindles E in the direction indicated by the arrow in Fig. 4 tends to progress them and the drum F in the direction indicated by the dotted arrow at the top of Fig. 3, and to prevent such progression I provide said drum F with the pawls $F^5$, which engage in the stationary ratchet L, which is conveniently fixed to the supporting-framework M. Therefore when the gear B is secured to the shaft A as the driving medium, the spindles E being prevented from progression, the sleeve D' is rotated, in the direction of the arrow marked thereon in Fig. 3, at a rate of speed which is much slower than that of the shaft A and determined by the ratio of the engaged gears B G and I D. During the rotation of the sleeve D' at said slow speed the planetary gears H J respectively rotate the gears C and $k$ idly in the same direction as said shaft and sleeve. When it is desired to rotate said sleeve at the medium speed, the gear C is secured to the shaft A as the driving medium, and the planetary-gear spindles E are rotated more rapidly by reason of the difference in ratio between the engaged gears C H and the now idle gears B G, so that the hub E' and pawls $e$ slip forward with respect to the gear G without engaging the latter, and said sleeve D' is rotated by the engaged gears I and D. During the operation of the device at medium speed the brake-drum K is idly rotated, as during the operation previously described.

When it is desired to drive the sleeve D' at the highest speed, the drum F is secured in fixed relation with the shaft A as the driving medium, and the sleeve D', being held by the several gears in fixed relation with said shaft A, of course rotates at the same speed as the latter.

As above described, the drum F has a tendency to rotate in the direction indicated by the dotted arrow upon Fig. 3 and is only prevented from thus rotating by the engagement of the pawls $F^5$ in the stationary ratchet L. Therefore if the drum F is freed from the ratchet L, and the brake-drum K, which normally rotates idly in the direction of rotation of the shaft A, is prevented from rotating, the progression of the planetary gears J around the gear $k$ of said brake-drum serves to reversely rotate said drum F in the direction of the dotted arrow in Fig. 3 at a speed greater than the speed of rotation of the sleeve D' in the opposite direction with respect to said drum F, with the result that the direction of rotation of the sleeve D is reversed with respect to the direction of rotation of the shaft A.

In order to conveniently secure the gears B C and the drum F in fixed relation with the shaft A to effect the operations before described, I provide them with respective drum-flanges B' C' F', opposed to the disk A', which is fixed upon the shaft A, and provide said disk with clutch-bands $B^2$ $C^2$ $F^2$, which are respectively secured at one extremity in fixed relation with said disk upon pins $b$ $c$ $f$ and operated at the other extremity to grip their respective flanges by means of respective clutch-levers $B^3$ $C^3$ $F^3$. As shown in the several figures, said clutch-levers oscillate upon axes $b^3$ $c^3$ $f^3$ in said disk A' and are provided at their outer extremities with respective arms $B^4$ $C^4$ $F^4$. As best shown in Fig. 1, said clutch-arms are extended for oscillation in respectively different planes, the arm $B^4$ being farthest from the disk A', the arm $C^4$ occupying the middle distance, and the arm $F^4$ being mounted immediately adjoining said disk. The described arrangement of said clutch lever-arms permits of their successive operation by the longitudinal traverse of the cone-collar O upon the shaft A. Said collar thrusts the levers $B^4$ $C^4$ $F^4$ outwardly by contact with the respective friction-rollers $b^4$ $c^4$ $f^4$ and is conveniently actuated by the lever P, whose pin-block $p$ is fitted to the groove $o$ in the collar. It is to be understood that when said cone-collar O occupies the position shown in dotted lines in Fig. 1 all of the clutch-levers are released, and said shaft A rotates, idly carrying with it the disk A', the clutch-levers, and their connected bands, which latter slide idly upon the flanges opposed to them. When, however, said cone-collar is thrust toward the disk A', it first contacts with the roller $b^4$ and shifts the lever $B^3$ so that the band $B^2$ is drawn taut around the flange B' and the gear B thereby secured in fixed relation with the shaft A to operate the device at slowest speed. The clutch-lever $C^3$ being similarly operated by the further traverse of the collar O toward the disk A', the gear C is secured in fixed relation with shaft A and the device thereby operated at medium speed. Further traverse of said collar O to the position shown in full lines in Fig. 1 secures the drum F in fixed relation with the shaft A, with the resulting operation of the device at highest speed.

It is to be understood that what I have termed the "reversing brake-drum" K is not used to check the speed of rotation of the device, but to effect the reverse rotation of the sleeve D'. As above described, said drum K normally rotates idly in the same direction as the shaft A. As shown in Figs. 1 and 3, said brake-drum K is provided with a clutch-band K', one end of which is secured upon the fixed stud $k'$ in the frame M and the free end of which is secured upon the inner extremity $k^2$ of the lever $K^2$, which is fulcrumed at $K^3$ upon said frame. It is to be understood that when it is desired to render said drum K stationary, and thus effect reverse rotation of the sleeve D', said brake-lever $K^2$ is shifted in the direction of the arrow shown thereon in Fig. 3, and said drum K is thereby rendered stationary. However, the clamping of the drum K causes the planetary gears J to progress around the gear $k$ and carry the drum F in the direction of the dotted arrow upon Fig. 3. Therefore it is necessary to disengage the pawls $F^5$ from the stationary ratchet L before said lever $K^2$ is operated, and for this purpose I have provided the releasing-disk L', whose teeth are counterpart with those upon the ratchet L and normally registered therewith, but which is capable of partial rotation in the direction of the arrow marked thereon in Fig. 3 to bring the teeth of said disk L' out of registry with the teeth in the stationary ratchet L, and thereby thrust the pawls $F^5$ out of engagement with said ratchet and provide a smooth surface for the broad points of the pawls to ride upon. Said releasing-disk L' is conveniently operated by means of the lever $L^2$, (shown in Fig. 3,) and the limit of motion of said disk with respect to the stationary ratchet is predetermined by the length of the slot l' in said disk, which is engaged with the pin l upon said ratchet.

The parts last described are operated to reverse the direction of rotation of the sleeve D' at either the slowest or medium speed, as follows: The lever L² of the releasing-disk L' is shifted in the direction of the arrow marked upon it in Fig. 3, and the pawls F⁵ being thereby disengaged from said ratchet L the drum F is free to rotate in the reverse direction. (Indicated by the dotted arrow in Fig. 3.) Thereupon the brake-lever K² is shifted in the direction of the arrow marked upon it, and the drum K being clamped by the tightened brake-band K' the drum F proceeds to rotate in the reverse direction, with the pawls F⁵ sliding alternately upon the peripheries of the ratchet L and the disk L'.

For simplicity of illustration I have shown each of the bands B², C², F², and K' without means for compensating for wear of the parts. However, it is to be understood that each of said bands may be provided with such means, and I have shown such means applied to the normally-fixed extremity of the band F² in Fig. 5, wherein the terminal bight of the band embraces the head of the T-bolt $f^5$, which may be adjusted with respect to its support by rotation of the nuts $f^6$.

Although I have described the driven element D' as a "sleeve," it is to be understood that I have used that term in a descriptive and not in a restrictive sense, as said part D' is made tubular in the described form of my invention merely as a matter of convenience.

I do not desire to broadly claim the use of planetary gearing in devices of the class to which this invention relates. However, I do not desire to limit myself to the precise arrangement of the parts which I have shown, as it is obvious that various modifications may be made therein without departing from the essential features of my invention.

I claim—

1. In variable-speed gearing, the combination with a driving-shaft; of a driven sleeve in concentric relation with said shaft; a gear in concentric relation with said shaft; means to secure said gear in fixed relation with said shaft; a drum mounted in concentric relation with said shaft; a planetary-gear spindle mounted for rotation in said drum in engagement with said shaft-gear; a gear upon said spindle, in engagement with said sleeve; means to normally detain said drum; means to release said detained drum; and means to effect reverse rotation of said sleeve at the will of the operator, substantially as set forth.

2. In variable-speed gearing, the combination with a driving-shaft; of a driven sleeve in concentric relation with said shaft; a plurality of gears of different diameters mounted in concentric relation with said shaft; means to successively secure said gears in fixed relation with said shaft; planetary gears upon a common spindle respectively engaged with said gears of different diameters; a gear upon said spindle in engagement with said sleeve; and means to normally prevent planetary progression of said spindle, substantially as set forth.

3. In variable-speed gearing, the combination with a driving-shaft; of a driven sleeve in concentric relation with said shaft; a plurality of gears of different diameters mounted in concentric relation with said shaft; means to successively secure said gears in fixed relation with said shaft; planetary gears upon a common spindle respectively engaged with said gears of different diameters; a gear upon said spindle in engagement with said sleeve; means to normally prevent planetary progression of said spindle; means to release said spindle; and means to effect reverse rotation of said sleeve, substantially as set forth.

4. In variable-speed gearing, the combination with a driving-shaft; of a driven sleeve in concentric relation with said shaft; two clutch-drums provided with gears of respectively different diameters mounted in concentric relation with said shaft; a third clutch-drum mounted in concentric relation with said shaft; a gear upon the inner extremity of said sleeve; gears mounted in said third drum, upon a common spindle, in planetary relation with said sleeve-gear and with the respective gears upon the other clutch-drums; means to successively secure said drums in fixed relation with said shaft, and thereby vary the speed of rotation of said sleeve with respect to said shaft, substantially as set forth.

5. In variable-speed gearing, the combination with a driving-shaft; of a driven sleeve in concentric relation with said shaft; a lever-bearing disk fixed upon said shaft; a plurality of drums mounted in concentric relation with said shaft opposed to said disk and provided with gears; clutch-levers mounted for oscillation in said disk, and arranged to respectively secure said drums in fixed relation with said shaft; a cone-collar in slidable relation with said shaft arranged to operate said clutch-levers; and means to shift said cone-collar longitudinally upon said shaft to successively operate said clutch-levers, and thereby vary the speed of rotation of said sleeve with respect to said shaft, substantially as set forth.

6. In variable-speed gearing, the combination with a driving-shaft; of a driven sleeve in concentric relation with said shaft; inner and middle clutch-drums respectively mounted in concentric relation with said shaft and provided with gears of respectively different diameters; an outer clutch-drum mounted in concentric relation with said shaft; a planetary-gear spindle mounted to rotate in said outer drum; a gear upon the inner extremity of said driven sleeve; a gear fixed upon said spindle in engagement with said sleeve-gear;

an annular gear in detachable relation with said spindle and engaged with said inner clutch-drum; means to automatically lock said gear-ring to said spindle by rotation of said ring in one direction and to render it independent of said spindle by rotation in the opposite direction; a gear fixed upon said spindle and engaged with said middle clutch-drum; a brake-drum; a gear fixed upon said spindle in engagement with said brake-drum; a brake arranged to engage said brake-drum; a stationary ratchet; a pawl upon said outer clutch-drum normally engaged with said stationary ratchet; means to disengage said pawl from said ratchet at the will of the operator; and means to successively secure said clutch-drums in fixed relation with said shaft, substantially as set forth.

7. In variable-speed gearing, the combination with a driving-shaft; of a driven sleeve in concentric relation with said shaft; a gear upon said sleeve; a gear in concentric relation with said shaft; means to secure said gear in fixed relation with said shaft; a planetary-gear spindle; gears upon said spindle respectively engaged with said shaft-gear and said sleeve-gear; a normally idle reversing-gear in concentric relation with said shaft; a gear upon said spindle in engagement with said reversing-gear; and means to detain said reversing-gear and thereby effect reverse rotation of said sleeve at the will of the operator, substantially as set forth.

LEWIS JONES, Jr.

Witnesses:
ARTHUR E. PAIGE,
E. L. FULLERTON.